(12) United States Patent
Srinivasan et al.

(10) Patent No.: US 10,447,577 B2
(45) Date of Patent: Oct. 15, 2019

(54) APPARATUS AND METHOD FOR EXPEDITING TRANSMISSION OF VEHICLE MESSAGES

(71) Applicant: Honeywell International Inc., Morris Plains, NJ (US)

(72) Inventors: Divya Swarup Giriyappa Srinivasan, Bangalore (IN); Thomas D. Judd, Woodinville, WA (US)

(73) Assignee: Honeywell International Inc., Morris Plains, NJ (US)

( * ) Notice: Subject to any disclaimer, the term of this patent is extended or adjusted under 35 U.S.C. 154(b) by 312 days.

(21) Appl. No.: 15/369,695

(22) Filed: Dec. 5, 2016

(65) Prior Publication Data
US 2018/0159763 A1    Jun. 7, 2018

(51) Int. Cl.
*H04B 7/185* (2006.01)
*H04W 48/18* (2009.01)
(Continued)

(52) U.S. Cl.
CPC .......... *H04L 45/22* (2013.01); *H04B 7/18506* (2013.01); *H04B 7/18508* (2013.01); *H04L 5/0055* (2013.01); *H04L 43/0864* (2013.01); *H04L 47/14* (2013.01); *H04L 47/29* (2013.01); *H04W 4/90* (2018.02); *H04W 48/16* (2013.01); *H04W 48/18* (2013.01); *G08G 5/0013* (2013.01)

(58) Field of Classification Search
CPC ... H04L 45/22; H04L 5/0055; H04L 43/0864; H04L 47/29; H04L 4/90; H04W 4/22; H04W 48/18; G08G 5/0013; H04B 7/18506; H04B 7/18508
See application file for complete search history.

(56) References Cited

U.S. PATENT DOCUMENTS 5,014,052 A * 5/1991 Obeck ................. G08G 1/087
340/906
6,147,980 A * 11/2000 Yee ..................... H04B 7/18508
370/316
(Continued)

FOREIGN PATENT DOCUMENTS

| EP | 1798872 A2 | 6/2007 |
| EP | 2023685 A1 | 2/2009 |
| WO | 03053013 | 6/2003 |

OTHER PUBLICATIONS

"Messaging Patterns", "Copyright: 2015; Retrieved Dec. 5, 2016 from http://www.enterpriseintegrationpatterns.com/patterns/messaging/DynamicRouter.html".
(Continued)

*Primary Examiner* — Marisol Figueroa
(74) *Attorney, Agent, or Firm* — Fogg & Powers LLC

(57) ABSTRACT

In one embodiment, a method for processing vehicle messages is provided. The method comprises: receiving a vehicle message for transmission; determining whether a condition exists to expedite transmission of the vehicle message; determining if a preferential sub-network is available; determining if at least one less preferential sub-network is available; and when the condition exists, when the preferential sub-network is not available for use, and the less preferential sub-network is available, expediting the transmission of the vehicle message over a less preferential sub-network.

20 Claims, 10 Drawing Sheets

(51) Int. Cl.
*H04L 12/707* (2013.01)
*H04W 48/16* (2009.01)
*H04L 12/801* (2013.01)
*H04W 4/90* (2018.01)
*H04L 5/00* (2006.01)
*H04L 12/26* (2006.01)
*G08G 5/00* (2006.01)

(56) References Cited

U.S. PATENT DOCUMENTS

| | | | |
|---|---|---|---|
| 6,353,779 B1 | 3/2002 | Simon et al. | |
| 7,519,014 B2* | 4/2009 | Allen | H04B 7/18508 370/310 |
| 8,045,977 B2 | 10/2011 | McGuffin | |
| 8,284,674 B2 | 10/2012 | True et al. | |
| 2003/0158963 A1 | 8/2003 | Sturdy et al. | |
| 2006/0030290 A1* | 2/2006 | Rudolf | H04W 76/007 455/404.1 |
| 2008/0004049 A1* | 1/2008 | Yigang | H04L 12/585 455/466 |
| 2009/0117895 A1* | 5/2009 | McGuffin | H04B 7/18506 455/431 |
| 2009/0216900 A1* | 8/2009 | Abjanic | H04L 69/22 709/235 |
| 2010/0167723 A1 | 7/2010 | Soumier et al. | |
| 2010/0267383 A1* | 10/2010 | Konstantinou | H04W 48/18 455/435.2 |
| 2011/0145125 A1* | 6/2011 | Foygel | G06Q 30/0601 705/37 |
| 2013/0005262 A1* | 1/2013 | Sakata | H04W 72/10 455/41.2 |
| 2017/0054490 A1* | 2/2017 | Zeng | H04B 7/18506 |
| 2017/0257320 A1* | 9/2017 | Bolling | H04L 47/12 |

OTHER PUBLICATIONS

European Patent Office, "Communication pursuant to Article 94(3) from EP Application No. 17204224.4 dated Jul. 9, 2018", "from Foreign Counterpart of U.S. Appl. No. 15/369,695", dated Jul. 9, 2018, p. 1-5, Published in: EP.

European Patent Office, "Communication under Rule 71(3) from EP Application No. 17204224.4 dated Feb. 8, 2019", from Foreign Counterpart to U.S. Appl. No. 15/369,695, dated Feb. 8, 2019, pp. 1-38, Published: EP.

European Patent Office; Extended European Search Report from EP Application No. 17204224.4 dated Apr. 20, 2018; from Foreign Counterpart of U.S. Appl. No. 151369,695; dated Apr. 20, 2015; pp. 1-7; Published in EP.

\* cited by examiner

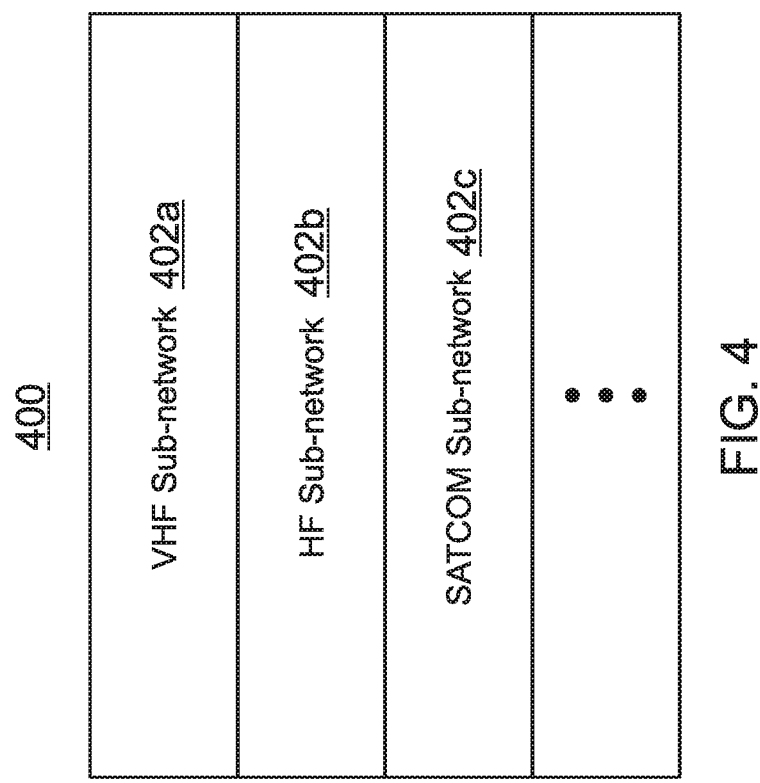

500

| Vehicle Message Type 1 311 | Vehicle Message Type 1 Threshold 502a |
| Vehicle Message Type 2 312 | Vehicle Message Type 2 Threshold 502b |
| Vehicle Message Type 3 313 | Vehicle Message Type 3 Threshold 502c |
| ⋮ | ⋮ |

| VHF 402a | VHF Sub-network Threshold 504a |
| HF 402b | HF Sub-network Threshold 504b |
| SATCOM 402c | SATCOM Sub-network Threshold 504c |
| ⋮ | ⋮ |

FIG. 5B

| 600 | |
|---|---|
| VHF 402a | VHF Round Trip Threshold 602a |
| HF 402b | HF Round Trip Threshold 602b |
| SATCOM 402c | SATCOM Round Trip Threshold 602c |
| ... | ... |

FIG. 6

APPARATUS AND METHOD FOR EXPEDITING TRANSMISSION OF VEHICLE MESSAGES

BACKGROUND

Modern aircraft often have more than one useable communications network through which to transmit and receive messages from terrestrial locations. At least one communications network is most preferred, e.g. because it has the lowest cost. As a result, messages are sent over the most preferred communications network to reduce cost. However, this can create a bottleneck which can delay the receipt of messages. If the messages are important, or if an emergency has arisen, then at least some of the messages need to bypass the bottleneck.

SUMMARY

In one embodiment, a method for processing vehicle messages is provided. The method comprises: receiving a vehicle message for transmission; determining whether a condition exists to expedite transmission of the vehicle message; determining if a preferential sub-network is available; determining if at least one less preferential sub-network is available; and when the condition exists, when the preferential sub-network is not available for use, and the less preferential sub-network is available, expediting the transmission of the vehicle message over a less preferential sub-network.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 illustrates an exemplary table of sub-network preference(s) of a vehicle message type;

FIG. 5A illustrates an exemplary vehicle message type threshold(s) table;

FIG. 5B illustrates an exemplary sub-network threshold(s) table;

FIG. 6 illustrates an exemplary round trip time threshold(s) table;

In accordance with common practice, the various described features are not drawn to scale but are drawn to emphasize specific features relevant to the exemplary embodiments. Reference characters denote like elements throughout figures and text.

DETAILED DESCRIPTION

Figure 1:
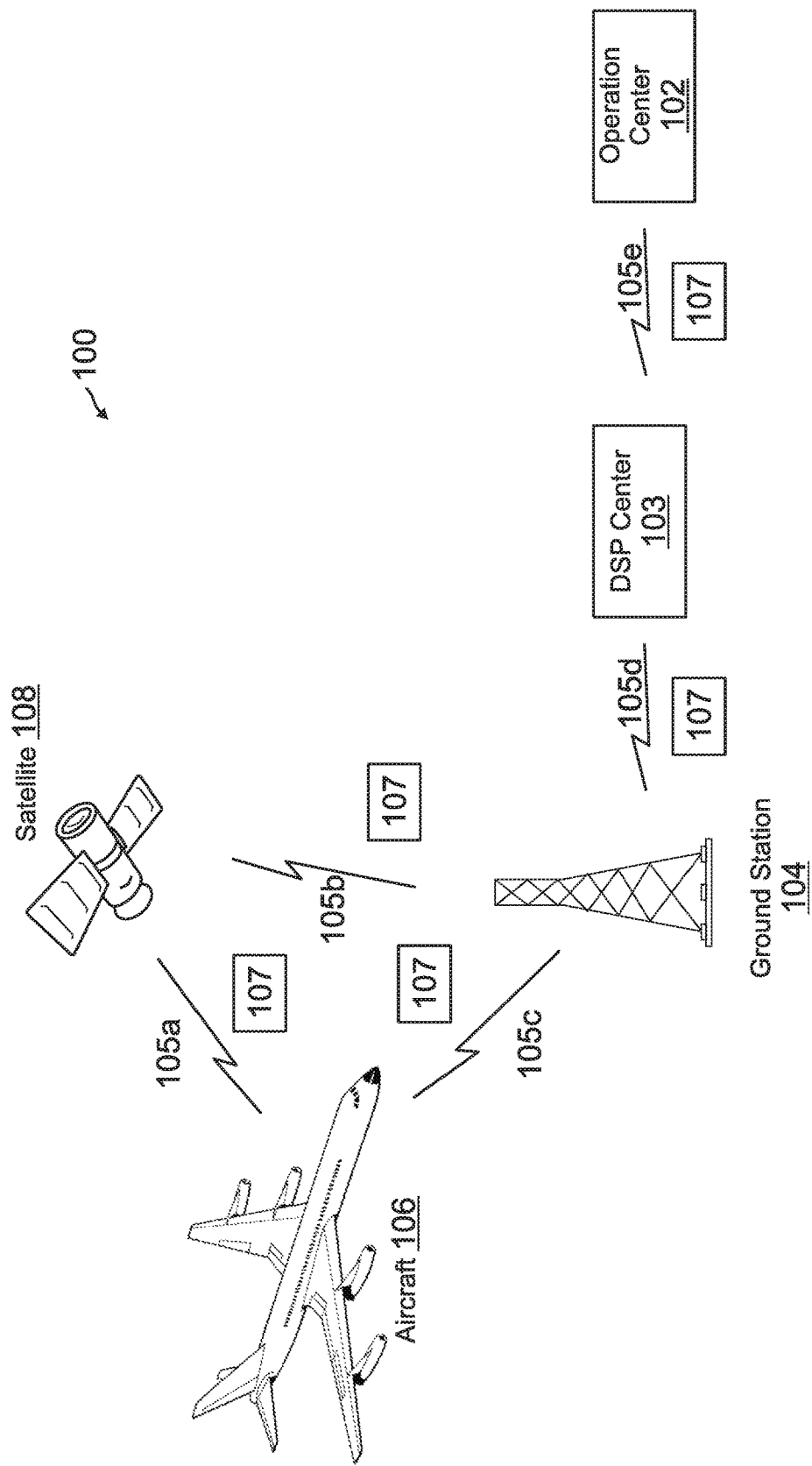
FIG. 1 illustrates an exemplary vehicle communications system that expedites transmission of vehicle messages.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A method and apparatus to expedite transmission of vehicle messages may be used to overcome the above referenced problem. Expediting transmission of a vehicle message means transmitting the vehicle message sooner then would otherwise occur. In one embodiment, vehicle message transmission can be expedited based upon (a) exceeding a threshold of the number of vehicle messages (or data blocks forming vehicle messages) of a vehicle message type awaiting transmission, (b) exceeding the round trip time threshold of a given sub-network, (c) whether the vehicle message is a vehicle message type categorized as an expedited message type, (d) whether an emergency condition exists and the vehicle message is a vehicle message type categorized as an emergency message type, or (e) whether the vehicle message is identified, i.e. flagged, as an emergency vehicle message.

For purposes of clarity, the terms emergency condition, emergency vehicle message type, emergency flag and emergency message shall mean a condition, a vehicle message type, a flag and a message of or corresponding to a highest priority; however, they shall not be limited to dangerous or life threatening circumstances. Expedited vehicle message type shall mean a vehicle message type of a second highest priority.

Vehicle message shall mean either a message transmitted from a vehicle, or to a vehicle. In one embodiment, the transmission shall be sent through an initial sub-network, and zero or more other sub-networks. In another embodiment, the source transmitting the vehicle message receives, or is intended to receive, an acknowledgement of receipt from the intended recipient.

Sub-network shall mean any communications network, including without limitation HF, VHF, satellite communications (SATCOM), cellular, wide area, Aeronautical Mobile Airport Communications System (AeroMACS), WiMax, and Wi-Fi networks. An active communications network, or active sub-network, shall mean any communications network that forms a reliable communications link, i.e. a communications network through which a vehicle message is being or can be transmitted; respectively is being received, or can be promptly received upon transmission by the intended recipient and for which an acknowledgement of receipt of the vehicle message is or can be promptly received from an intended destination. An available sub-network shall mean any active communications network which is free to transmit a vehicle message, i.e. is not presently transmitting a vehicle message or awaiting an acknowledgement of receipt of a vehicle message from the intended destination.

FIG. 1 illustrates an exemplary vehicle communications system 100 that expedites transmission of vehicle messages 107. Embodiments of apparatuses and methods of expediting transmission of the vehicle messages 107 will be illustrated further below.

In FIG. 1, by way of example, an aircraft 106 is shown as the vehicle. However, the invention is applicable to all vehicles, including ships and land vehicles. Thus, the illustration of an aircraft as a vehicle herein should not be limiting.

The illustrated embodiment of the vehicle communications system 100 includes an aircraft 106, an operations center 102, a data service provider (DSP) center 103, a ground station, and a satellite 108. In one embodiment, the ground station 104 transitions transmission of vehicle messages 107 from one communications network to another communications network, e.g. (a) through a wide area network (WAN) or local area network (LAN), coupling the operations center 102 and the data service provider 103; (b) through a dedicated T1 line coupling the data service provider 103 to a ground station 104; and through a SATCOM network, coupling the ground station 104 to the aircraft 106. The operations center 102 and aircraft 106 are coupled by communications links 105a, 105b, 105c, 105d, 105e. Each sub-network, over which vehicle messages 107 are transmitted, is formed by one or more communications links. For example, the aircraft 106 may transmit and receive vehicle messages 107 respectively to and from a ground station 104 through a SATCOM sub-network formed by two communications links 105a, 105b coupled through a satellite 108. Alternatively, the aircraft 106 may transmit and receive vehicle messages 107 respectively to and from the ground station 104 through, e.g. an HF or VHF, sub-network formed by one communications link 105c. The ground station 104 may transmit and receive vehicle messages 107 respectively to and from the operations center 102 through the data service provider 103, and two communications links 105d, 105e e.g. respectively a combination of one or more of a LAN and/or a WAN.

At least one of the aircraft 106, operations center 102, data service provider 103, and ground station 104 are configured to expedite transmission of vehicle messages 107. In one embodiment, if an aircraft 106 is configured to expedite transmission of vehicle messages 107, it may expedite transmission of vehicle messages on an available, less preferred sub-network if a preferred sub-network is not available. Embodiments for doing so will be subsequently described.

Figure 2A:
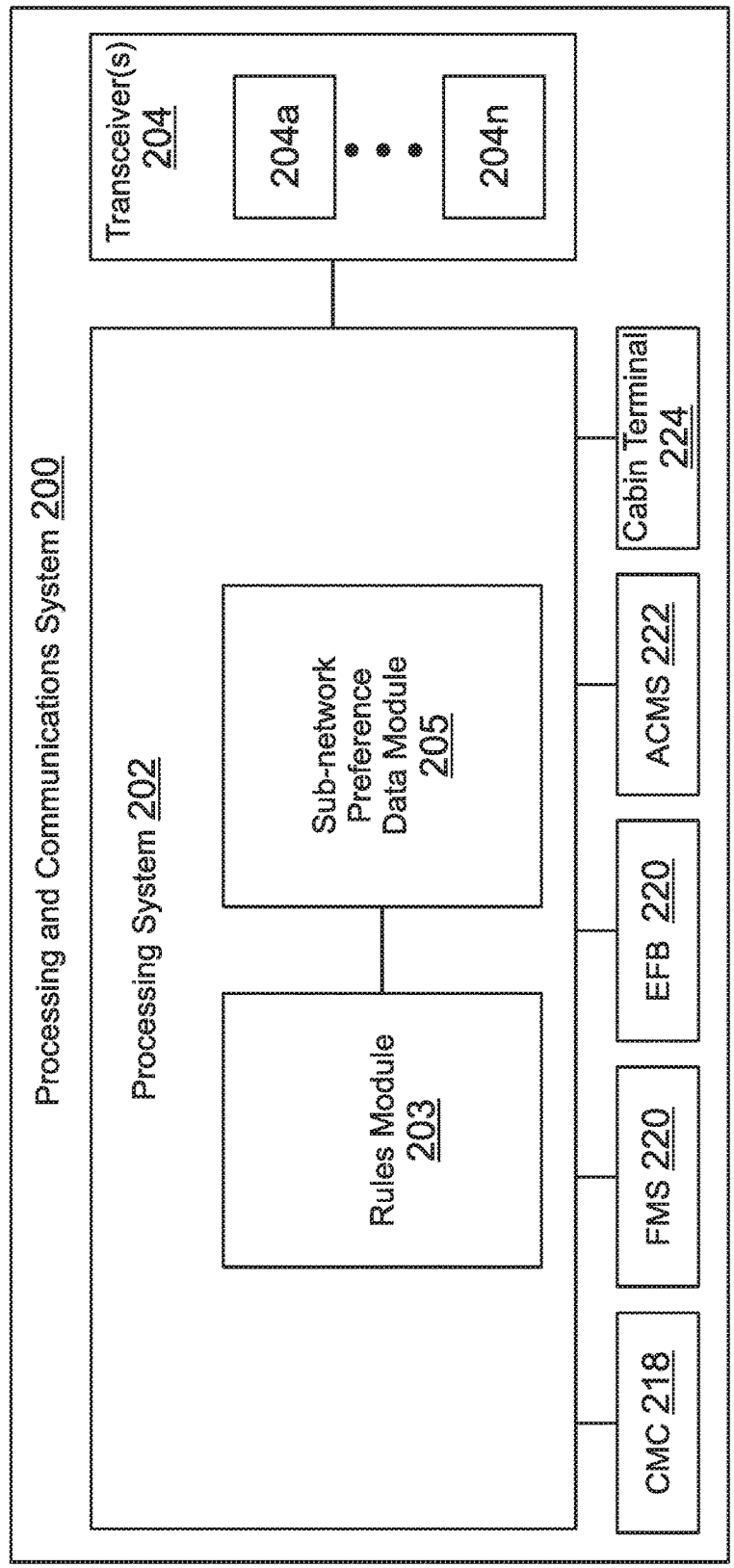
FIG. 2A illustrates an exemplary processing and communications system that expedites vehicle messages.

FIG. 2A illustrates an exemplary processing and communications system 200 that expedites transmission of vehicle messages 107. The processing system 202 includes a rules module 203 and a sub-network preference data module 205. The rules module 203 includes at least one set of rule(s) that specify at least one condition when to expedite the transmission of a vehicle message 107. The sub-network preference data module 205 specifies preferential and less preferential sub-networks which are to be used by different vehicle message types. In one embodiment, the preferential and less preferential sub-networks are specified in order of preference, e.g. lowest to highest cost with the lowest cost being the most preferential. In another embodiment, there may be different sets of rules modules 203 and/or sub-network preference data modules 205. For example, there may be different sets corresponding to different geographical regions.

Upon the occurrence, for a vehicle message, of the at least one condition specified in the rules module 203, when a preferential sub-network is not available and a less preferential sub-network is available, the processing system 202 is configured to facilitate transmission of the vehicle message over the less preferential sub-network.

Different embodiments for implementing the processing system 202 (including the rules module 203 and the sub-network preference data module 205) are contemplated. In one embodiment, the rules module 203 and the sub-network preference data module 205 may be stored and retrieved from data file(s) or look up table(s) in one or more memories or other storage devices. Such data files and look up tables may be processed by a processor or another type of processing device such as a state machine. In another embodiment, the rules module 203 and the sub-network preference data module 205 may be encoded in executable code which is stored in a memory or other storage device, and executed on a processor or another type of processing device. In a further embodiment, the rules module 203 and the sub-network preference data module 205 may be programmed in and executed by logic circuitry such as a state machine.

Figure 2B:
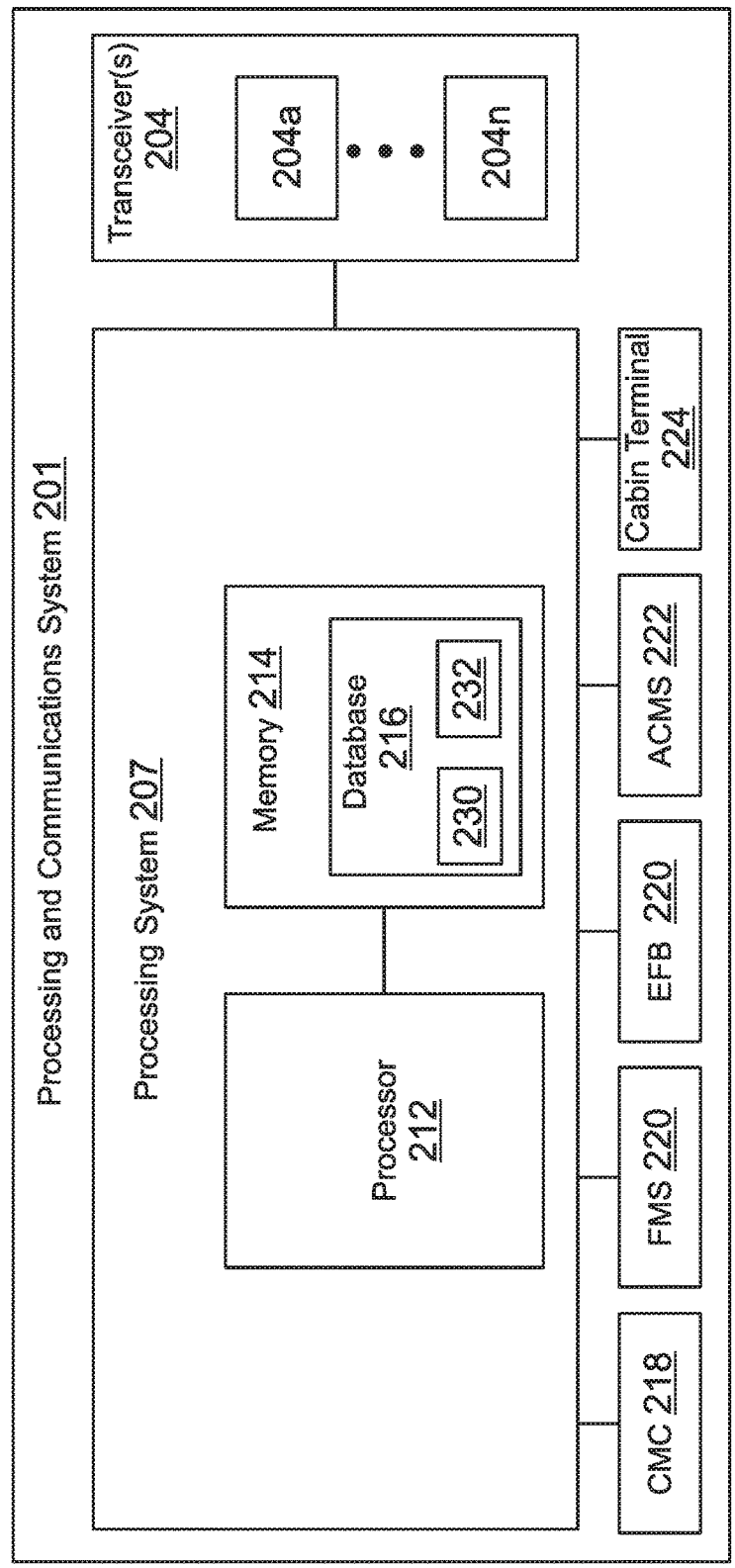
FIG. 2B illustrates another exemplary processing and communications system that expedites vehicle messages

FIG. 2B illustrates another exemplary processing and communications system 201 that expedites vehicle messages 107. The processing system 207 includes a processor 212, a memory 214, and a database 216.

The processing system 202, e.g. the database 216 therein, is configured to include sub-network preference data 230 that identifies preferential and less preferential sub-networks, and at least one set of rule(s) 232 that specify at least one condition when expedite the transmission of a vehicle message 107. Upon the occurrence of the at least one condition, when the preferential sub-network is not available and a less preferred sub-network is available, the processing system 202 is configured to facilitate transmission of the vehicle message over a less preferential sub-network.

In one embodiment, the processing and communications systems 200, 201 include a processing system 202, 207 coupled to at least one transceiver 204. In another embodiment, the at least one transceiver 204 includes two or more, e.g. 2 to n, transceivers 204x where each transceiver operates on, or is associated with, a unique sub-network.

In one embodiment, the processing systems 202, 207 are communications management units (CMUs). In another embodiment, the processing systems 202, 207 host communications management functions (CMFs).

In one embodiment, the processing system 207 includes a processor 212 coupled to a memory 214. In another embodiment, the memory 214 includes a database 216 (e.g. the database 216 resides in the memory 214). In this embodiment, as will be further described below, the database 216 is used by the processing and communications system 200 to facilitate expediting transmission of vehicle messages 107 according to criteria specified in the database 216. In a further embodiment, the database 216 is part of the airline modifiable information database. In yet a further embodiment, the database 216 is part of an aircraft communications addressing and reporting system (ACARS) reconfigurable tool database.

In one embodiment the processing and communications systems 200, 201 are located in vehicles, e.g. aircraft 106. In another embodiment, the processing and communications systems 200, 201 are located in either the data service provider center 103, operations center 102 or ground station 104. In a further embodiment, the processing and communications system 200, 201 are located in a vehicle, e.g. the aircraft 106, and in either the data service provider center 103, the operations center 102 or ground station 104.

In one embodiment, the operations center 102 is a vehicle operations center, e.g. an airline operations center. In another embodiment, the operations center 102 is a vehicle traffic control center, e.g. an air traffic control center. In a further embodiment, the operations center 102 is an aircraft operations center for business jet aircraft.

In the illustrated embodiment of FIGS. 2A and 2B, the processing and communications systems 200, 201 are in a vehicle that is an aircraft 106. In these embodiments, the processing and communications system 200 includes vehicle components, i.e. a central maintenance computer (CMC) 218, a flight management system (FMS) 220, an electronic flight bag (EFB) 220, an aircraft condition monitoring system (ACMS) 222, and a cabin terminal 224 which incorporate separate processing systems. However, in another embodiment, the central maintenance computer 218, flight management system 220, electronic flight bag 220, aircraft condition monitoring systems 222, and/or cabin terminal 224 may reside in the processing system 202. Other vehicle components may be coupled to, or incorporated within, the processing system 202. The central maintenance computer 218, flight management system 220, electronic flight bag 220, aircraft condition monitoring systems 222, cabin terminal 224, vehicle crew, vehicle operator (e.g. pilot), CMU or CMF, and other vehicle components may generate vehicle messages 107.

In one embodiment, the processing and communications systems 200, 201 may reside in either the data service provider center 103, the operations center 102, or ground station. In such case, the processing and communications systems 200, 201 would not included vehicle components such as the central maintenance computer 218, flight management system 220, electronic flight bag 220, aircraft condition monitoring systems 222, and/or cabin terminal 224. In this embodiment, the data service provider center 103 or the operations center 102 generates vehicle messages 107. In another embodiment, an operator at the operations center 102 can generate vehicle messages 107 to be sent to a vehicle. For example, an air traffic controller at an air traffic control center can generate messages to be sent to the aircraft 106. In a further embodiment, automated systems can generate vehicle messages 107 to be sent to a vehicle. In yet another embodiment, vehicle messages 107 to be sent to a vehicle can include maintenance report requests, gate information, airport information, operations information, notices to airmen (NOTAMs), location of other vehicles, and weather information.

Figure 3:
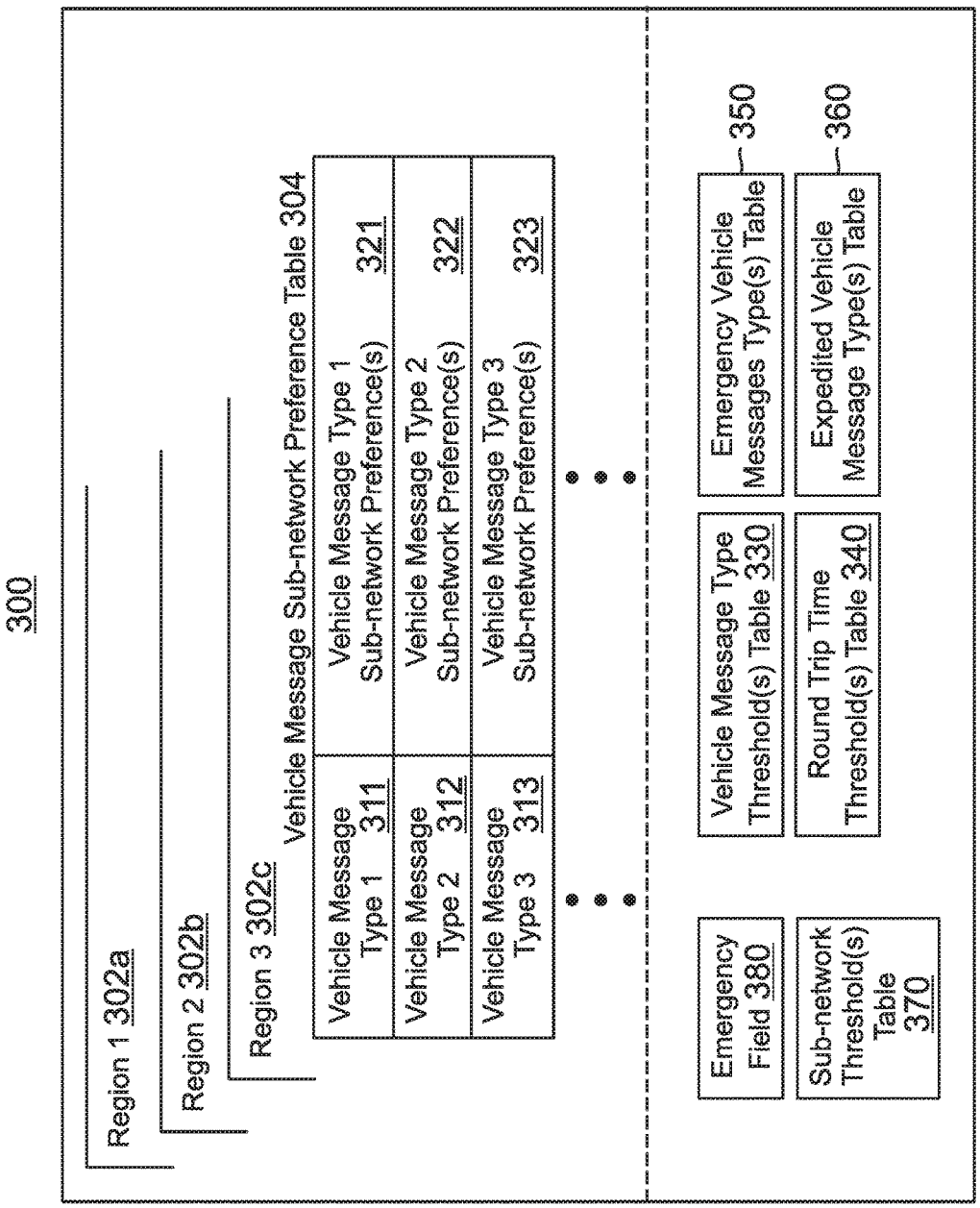
FIG. 3 illustrates an exemplary database.

FIG. 3 illustrates an exemplary database 300. In one embodiment, the database 300 is stored, e.g. in the memory 216, and analyzed and manipulated, e.g. by the processor 212, in the processing system 202. In another embodiment, the database 300 includes sub-databases, e.g. for two or more different regions. FIG. 3 illustrates three such sub-databases that are regional databases 302a, 302b, 302c for three different regions. In another embodiment, the different regions are different geographical regions, e.g. North America, Europe and China. In a further embodiment, each sub-database, e.g. regional database, includes a vehicle message sub-network preference table 304 (e.g. a regional sub-network preference table) which includes fields for different vehicle message types 311, 312, 313 and tables of corresponding vehicle message sub-network preferences 321, 322, 323. In yet a further embodiment, each sub-database, e.g. regional database, includes at least one table which specifies at least one condition to expedite the transmission of a vehicle messages of at least one vehicle message type, as are further described below.

In one embodiment, the vehicle message types include message types utilized by ACARS. In another embodiment, the vehicle message types include NOTAMs, air traffic control messages, aeronautical operational control messages, airline administrative control messages, equipment health and maintenance data messages, messages pertaining to out of gate, off the ground, on the ground and into the gate events, and flight crew messages (e.g. messages with information about weather or the status of connecting flights).

FIG. 4 illustrates an exemplary table 400 of sub-network preference(s) of a vehicle message type. In the illustrated embodiment of the table 400 of sub-network preference(s), sub-networks are listed in an exemplary preferential order, i.e. VHF sub-network 402a, HF sub-network 402b, and SATCOM sub-network 402c. In one embodiment, the preferential order is based upon a cost index where sub-networks are ordered by preference based upon cost of data transmission. The sub-network with the lowest cost has the highest preference, and the sub-network with the highest cost has the lowest preference. Thus, for the embodiment illustrated in FIG. 4, utilizing preferential order based upon a cost index, the VHF sub-network 402a has the lowest cost, and the SATCOM sub-network 402c has the highest cost.

Preferential sub-networks are sub-networks through which vehicle messages 107 are normally transmitted, e.g. because of its cost, except in the event that such preferential sub-networks are not available and upon the occurrence of a condition, e.g. a vehicle message 107 is an emergency message (discussed subsequently) or a threshold has been exceeded. In one embodiment, the first specified sub-network, e.g. VHF sub-network 402a, is the preferred (or preferential) sub-network, and the subsequent specified sub-networks, e.g. HF sub-network 402b and SATCOM sub-network 402c, are less preferred (or less preferential) sub-networks. In another embodiment, the first n specified sub-networks, and the subsequent specified networks are less preferred sub-networks, For example, for n=2, the VHF sub-network 402a and the HF sub-network 402b, are the preferred sub-networks, the SATCOM sub-network 402c, is the less preferred sub-network.

Returning to FIG. 3, in one embodiment, the database 300 includes a vehicle message type threshold(s) table 330, round trip time threshold(s) table 340, emergency vehicle message type(s) table 350, expedited vehicle message types(s) table 360, and sub-network threshold(s) table 370. In another embodiment, the database 300 includes an emergency field 380 indicating (depending upon its setting) if there is an emergency (or is not an emergency), e.g. on the vehicle in which the database 300 resides. The emergency field 380 may be stored elsewhere in the memory 214, or alternatively the processing system 202, e.g. the processor 212, is configured to receive an external signal indicating an emergency. The emergency field 380 and the external signal shall be herein referred to as the emergency flag.

In one embodiment, one or more of the aforementioned tables and field may be located in each of the regional databases 302a, 302b, 302c. In another embodiment, one or more of the aforementioned tables in each of the regional databases 302a, 302b, 302c may have contents that vary based upon the corresponding region for each regional database.

FIG. 5A illustrates an exemplary vehicle message type threshold(s) table 500 which identifies vehicle message types (i.e. vehicle message type 1 311, vehicle message type 2 312, and vehicle message type 3 313), and corresponding vehicle message type thresholds (i.e. vehicle message type 1 threshold 502a, vehicle message type 2 threshold 502b, and vehicle message type 3 threshold 502c). In one embodiment, a vehicle message type threshold is a maximum number of vehicle messages 107, or data blocks of vehicle messages 107, of a vehicle message type above which the processing and communications system 200, e.g. the processing system 202, commences transmitting, or facilitates transmission of, vehicle messages 107 of the message type on one or more less preferential, available sub-networks. In another embodiment, the less preferential available sub-network is selected based upon an order of preferred sub-networks specified in the table 400 of sub-network preference(s).

FIG. 5B illustrates an exemplary sub-network threshold(s) table 530 which identifies preferred sub-network types (i.e. VHF 402a, HF 402b, and SATCOM 402c), and corresponding sub-network type thresholds (i.e. VHF sub-network threshold 504a, HF sub-network threshold 504b, and SATCOM sub-network threshold 504c). In one embodiment, the sub-network threshold is a maximum number of vehicle messages 107, or data blocks forming vehicle messages 107, in a queue of a preferred sub-network above which the processing and communications system 200, e.g. the processing system 202, commences transmitting, or facilitates transmission of, vehicle messages 107 (which would have been placed in the preferred sub-network queue) on one or more less preferential, available sub-networks. In another embodiment, the less preferential available sub-network(s) are selected based upon the order of preferred sub-networks specified in the table 400 of sub-network preference(s).

FIG. 6 illustrates an exemplary round trip time threshold(s) table 600 which identifies sub-network types (e.g. VHF 402a, HF 402b, and SATCOM 402c), and corresponding maximum round trip time thresholds (e.g. VHF sub-network round trip time threshold 504a, HF sub-network round trip time threshold 504b, and SATCOM sub-network round trip time threshold 504c). Round trip time means the time between transmission of a vehicle message 107 from, and arrival of an acknowledgement of receipt (of the vehicle message 107 from the intended recipient) to, processing and communications system 200.

In one embodiment, a sub-network round trip time threshold is a maximum round trip time for vehicle messages 107 sent on the corresponding sub-network above which the processing and communications system 200, e.g. the processing system 202, commences transmitting, or facilitates transmission of, vehicle messages 107 (which would have been sent on the corresponding sub-network) on other less preferential available sub-network(s). In another embodiment, the less preferential available sub-network(s) are selected based upon the order of preferred sub-networks specified in the table 400 of sub-network preference(s).

In one embodiment, one or more of the thresholds in the vehicle message(s) threshold table, sub-network threshold(s) table, and the round trip time threshold(s) table are dynamic. In another embodiment, the dynamic thresholds in the aforementioned tables may vary based upon the number of, respectively, messages (or data blocks of messages) of a message type in queue(s), messages (or data blocks of messages) in a sub-network message queue, and the round trip time of a sub-network. In a further embodiment, the thresholds may be varied, e.g. by an operations center 102 or a data service provider center 103, or may be based upon recently measured corresponding round trip times.

Figure 7A:
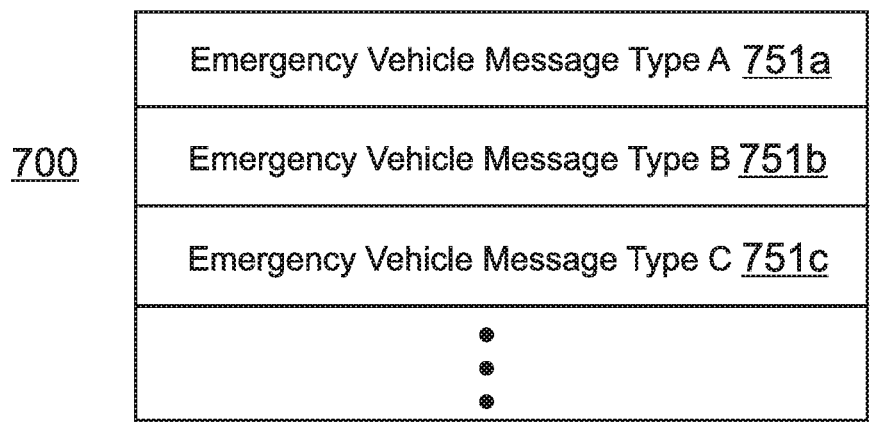
FIG. 7A illustrates an exemplary emergency vehicle message(s) table.

Vehicle messages 107 that are sent on an emergency basis are either emergency vehicle messages, or when the emergency flag is set to active, are of a vehicle message type that is an emergency vehicle message type. FIG. 7A illustrates an exemplary emergency vehicle message type(s) table 700 which identifies vehicle message types whose transmission would be expedited in the event of an emergency, or emergency vehicle message types, (i.e. emergency vehicle message type A 751a, emergency vehicle message type B 751b, and emergency vehicle message type C 751c). In one embodiment, transmission of messages containing vehicle position and vector velocity data would be expedited, e.g. by being designated as an emergency vehicle message type, in the event of an emergency.

Figure 7B:
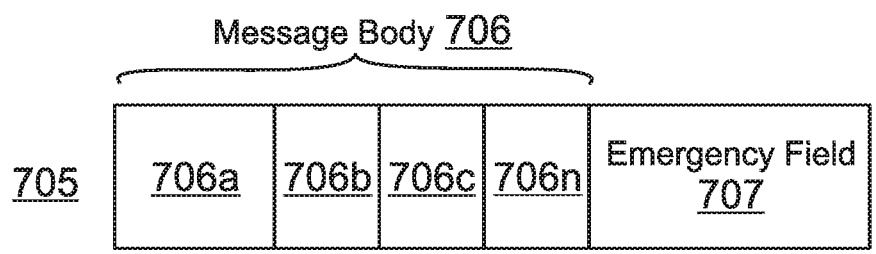
FIG. 7B illustrates an exemplary vehicle message data structure having a field to designate the vehicle message as an emergency vehicle message.

FIG. 7B illustrates an exemplary vehicle message data structure 705 having a field 707, e.g. an emergency field, to designate the vehicle message 107 as an emergency vehicle message. The vehicle data structure 705 also includes a message body 706. In one embodiment, the message body 706 comprises blocks of data 706a, 706b, 706c . . . 706n. In another embodiment, an operator or system, e.g. vehicle operator or vehicle system, can set the emergency field to active to designate the vehicle message 107 as an emergency vehicle message. Emergency vehicle messages and vehicle messages of an emergency message type (when the emergency flag is active) shall be referred to collectively as emergency messages.

Figure 7C:
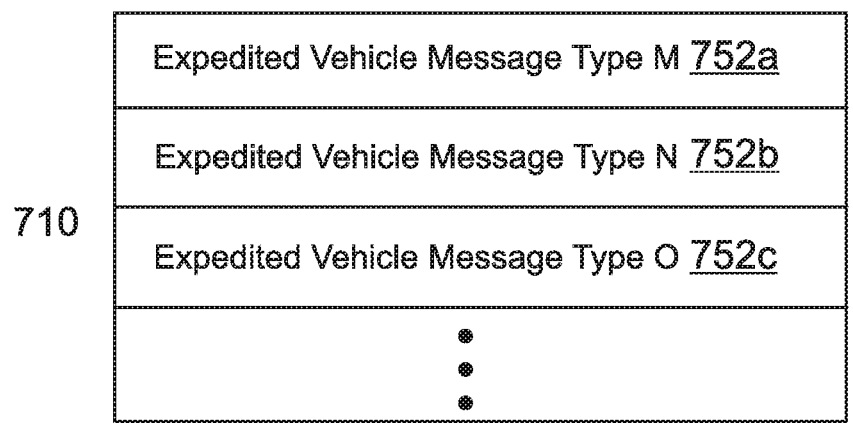
FIG. 7C illustrates an exemplary expedited vehicle message(s) table.

FIG. 7C illustrates an exemplary expedited vehicle message types(s) table 710 which identifies vehicle message types whose transmission is to be expedited. FIG. 7C illustrates exemplary expedited vehicle message types expedited vehicle message type M 752a, expedited vehicle message type N 752b, and expedited vehicle message type O 752c.

In one embodiment, emergency messages and vehicle messages 107 of an expedited message type (collectively 'expedited messages') are transmitted on an expedited basis. In another embodiment, the processing and communications system 200, e.g. the processing system 202, commences transmitting, or facilitates transmission of, expedited messages on any preferential or less preferential available sub-network. In a further embodiment, in the event of the lack of any available preferential or less preferential sub-networks, the processing and communications system 200, e.g. the processing system 202, interrupts the transmission of a non-expedited vehicle message being transmitted on a preferential or less preferential sub-network to transmit an expedited message on that sub-network. In yet another embodiment, after transmission of the emergency message is complete, transmission of the interrupted non-expedited message is continued on that sub-network. In yet a further embodiment, the processing and communications system 200, e.g. the processing system 202, commences transmitting, or facilitates transmission of, emergency messages on any available sub-network, even if the sub-network is a non-preferential sub-network, i.e. not a preferential or less preferential sub-network.

Figure 8:
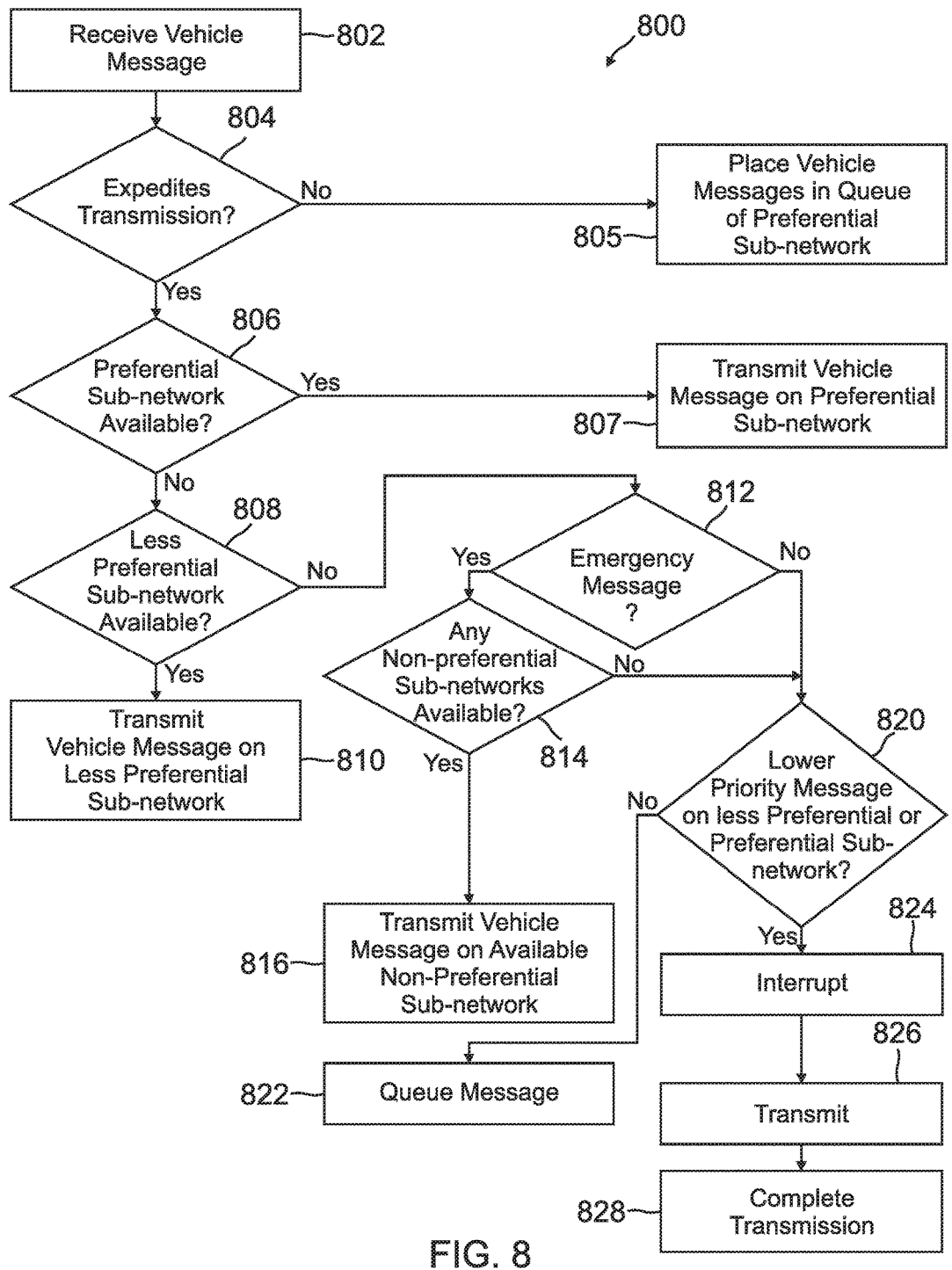
FIG. 8 illustrates an exemplary method of expediting transmission of vehicle messages.

FIG. 8 illustrates an exemplary method 800 of expediting transmission of vehicle messages 107. In block 802 a vehicle message 107 is received. In one embodiment, receiving a vehicle message 107 includes generating the vehicle message 107, e.g. in the processing and communications system 200 such as from a vehicle component. In block 804, determine whether the received vehicle message 107 is an expedited message, e.g. determine whether a condition exists to expedite transmission of the vehicle message 107. If the vehicle message 107 is not to be expedited, then in block 805, place the vehicle message 107 in the transmission queue of a preferred sub-network. In block 806, if it is determined that the vehicle message 107 should be expedited, then determine if a preferred sub-network is available. If a preferred sub-network is available, then in block 807 transmit the vehicle message 107 on the preferred available sub-network. If it is determined that a preferred sub-network is not available, then in block 808 determine if a less preferred sub-network is available. If a less preferred sub-network is available, then in block 810, transmit the vehicle message 107 to be expedited on the less preferred available sub-network. In one embodiment, if more than one less preferential sub-network is available, transmit the vehicle message 107 on the less preferential sub-network that has the highest preference, e.g. has the lowest cost.

In one embodiment if a less preferred sub-network is not available, then in block 812 determine if the vehicle message 107 is an emergency message. If the vehicle message 107 is an emergency message, then in block 814 determine if a non-preferential sub-network is available. A non-preferential sub-network is any sub-network other than preferential and less preferential sub-networks. If a non-preferential sub-network is available, then in block 816 transmit the vehicle message 107 on the non-preferential sub-network.

If the vehicle message 107 is not an emergency message, then in block 820 determine if a lower priority vehicle message is being transmitted or acknowledged on a preferred or less preferred sub-network. Alternatively in another embodiment, if no determination of whether the vehicle message 107 is an emergency message (i.e. block 812 is not included) and a less preferred sub-network is not available, then in block 820 determine if a lower priority vehicle message is being transmitted or acknowledged on a preferred or less preferred sub-network.

If the priority of the expedited message is lower than the vehicle message(s) 107 being transmitted or acknowledged on preferred or less preferred sub-networks, then in block 822, place the expedited message into a vehicle message queue of (or queue the expedited message in) a preferential or less preferential sub-network. In another embodiment, place the expedited message into the vehicle message queue of the most preferential, e.g. less costly, sub-network. In a further embodiment, place the vehicle message 107 into the vehicle message queue of a preferential or less preferential sub-network having the fewest vehicle messages in its queue.

If the priority of the expedited message is higher than the vehicle message(s) 107 being transmitted or acknowledged on preferred or less preferred sub-networks, then in block 824, interrupt a lower, e.g. the lowest, priority vehicle message 107 being transmitted or acknowledged. In one embodiment, complete transmission of a current block of data of the interrupted vehicle message but not the succeeding blocks of data of the interrupted vehicle message. In another embodiment, await receipt of the acknowledgement before transmitting the expedited message. In a further embodiment, interrupt the lowest priority message being transmitted or acknowledged, e.g. a non-emergency message. In yet another embodiment, interrupt the vehicle message 107 being transmitted or acknowledged on the preferential sub-network. In yet a further embodiment, place the vehicle message 107 of the higher priority vehicle message type at the top of the queue of the preferential or less preferential sub-network on which the lower priority message is being transmitted or acknowledged.

In block 826, transmit the expedited message on the sub-network on which the interrupted vehicle message was being transmitted or acknowledged. In one embodiment, in block 828, upon completing transmission of and receiving acknowledgement of receipt of the expedited message 107 having higher priority (i.e. message for which the condition exists to expedite transmission), complete transmission of the interrupted vehicle message. In one embodiment, transmit the unsent data blocks of the interrupted vehicle message, or alternatively re-transmit all blocks of the interrupted vehicle message.

Figure 9:
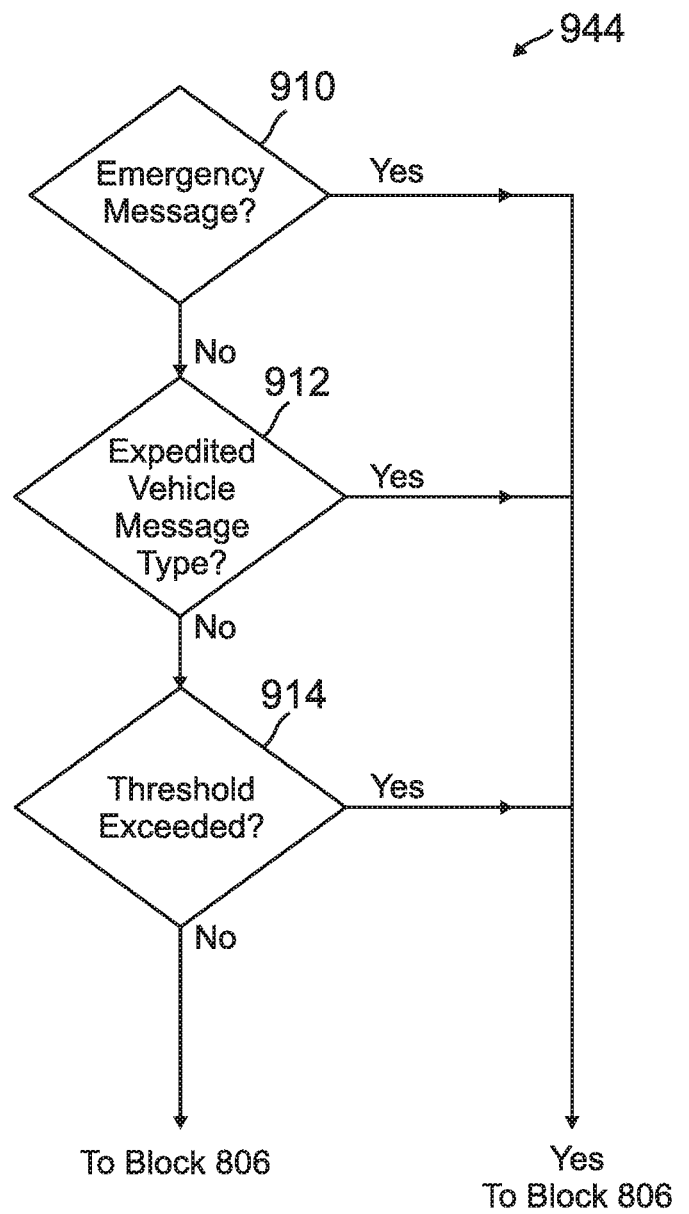
FIG. 9 illustrates one embodiment of a method of determining whether the received vehicle message is an expedited message.

FIG. 9 illustrates one embodiment of a method 944 of determining whether the received vehicle message 107 is an expedited message. More specifically, FIG. 9 illustrates one embodiment of block 804. In block 910, determine if (a) the vehicle message 107 is an emergency message. If yes, proceed to block 806 described above.

If no, proceed to block 912. In block 912, determine if the vehicle message type of the vehicle message 107 is an expedited vehicle message type, e.g. specified in the expedited vehicle message type(s) table 360. If yes, proceed to block 806 described above.

If no, proceed to block 914. If no, then in block 914, determine if a threshold has been exceeded. In one embodiment, determine if one or more of the following thresholds have been exceeded: (a) the vehicle message type threshold(s) for the vehicle message type of the vehicle message 107, e.g. specified in the vehicle message type(s) threshold(s) table 330; (b) the sub-network threshold(s) for the preferred sub-network(s) for the vehicle message type of the vehicle message 107, e.g. specified in the sub-network threshold(s) table 370; and (c) the round trip time threshold(s) for preferential sub-network(s) (or in another embodiment for preferential and less preferential sub-networks). If yes, proceed to block 806 described above. If no, proceed to block 805 described above.

EXAMPLE EMBODIMENTS

Example 1 includes a method for processing vehicle messages, comprising: receiving a vehicle message for transmission; determining whether a condition exists to expedite transmission of the vehicle message; determining if a preferential sub-network is available; determining if at least one less preferential sub-network is available; and when the condition exists, when the preferential sub-network is not available for use, and the less preferential sub-network is available, expediting the transmission of the vehicle message over a less preferential sub-network.

Example 2 includes the method of Example 1, wherein when the condition exists, when the preferential sub-network is not available for use, and the less preferential sub-network is available, expediting the transmission of the vehicle message over one of the at least one of the less preferential sub-network comprises wherein when the condition exists, when the preferential sub-network is not available for use, and the less preferential sub-network is available, expediting the transmission of the vehicle message over a less preferential sub-network having the highest preference.

Example 3 includes the method of any of Examples 1-2, determining whether a condition exists to expedite transmission of the vehicle message further comprises determining if the vehicle message is an emergency message.

Example 4 includes the method of any of Examples 1-3, determining whether a condition exists to expedite transmission of the vehicle message further comprises determining if the vehicle message is of an expedited vehicle message type.

Example 5 includes the method of any of Examples 1-4, wherein determining whether a condition exists to expedite transmission of the vehicle message further comprises determining if a threshold has been exceeded.

Example 6 includes the method of Example 5, wherein determining if the threshold has been exceeded further comprises determining if the vehicle message is of an expedited vehicle message type whose vehicle message type threshold has been exceeded.

Example 7 includes the method of any of Examples 5-6, wherein determining if the threshold has been exceeded further comprises determining if a sub-network round trip time threshold has been exceeded.

Example 8 includes the method of any of Examples 5-7, wherein determining if the threshold has been exceeded further comprises determining if a sub-network threshold has been exceeded.

Example 9 includes a method for processing vehicle messages, comprising: receiving a vehicle message for transmission; determining whether a condition exists to expedite transmission of the vehicle message; determining if a preferential sub-network is available; determining if a less preferential sub-network is available; when the condition exists, the preferential sub-network is not available for use, and the less preferential sub-network is not available, then determining if a vehicle message of a lower priority type is being transmitted or acknowledged on an active preferential or less preferential sub-network; and if a vehicle message of a lower priority type is being transmitted or acknowledged on an active preferential or less preferential sub-network, then interrupting the transmission or acknowledgement of the vehicle message of the lower priority type and transmitting on the same sub-network the vehicle message for which the condition exists to expedite transmission.

Example 10 includes the method of Example 9, wherein if a vehicle message of the lower priority type is being transmitted or acknowledged on an active preferential or less preferential sub-network, then interrupting the transmission or acknowledgement of the vehicle message of the lower priority type and transmitting on the same sub-network the vehicle message for which the condition exists to expedite transmission further comprises complete transmission and acknowledgement of the interrupted vehicle message of a lower priority type after completing transmission and receiving an acknowledgement of receipt of the vehicle message for which the condition exists to expedite transmission.

Example 11 includes the method of any of Examples 9-10, wherein determining if a vehicle message of a lower priority type is being transmitted or acknowledged on an active preferred or less preferred sub-network further comprises: determining if the vehicle message is an emergency vehicle message; if the vehicle message is an emergency message, then determining if any non-preferential sub-networks are available; and if a non-preferential sub-network is available, then transmitting the vehicle message on the non-preferential sub-network.

Example 12 includes a system, comprising: a processor; a memory coupled to the processor wherein the memory stores sub-network preference data and at least one at least one set of rule(s) that specify at least one condition when to expedite the transmission of a vehicle message; wherein the processor is configured to process one or more vehicle messages of different vehicle message types; and wherein upon the occurrence of at least one such a condition, when the most preferred sub-network is not available and a less preferred sub-network is available, the processor is configured to expedite transmission of the vehicle message over the less preferred available sub-network.

Example 13 includes the system of Example 12, further comprising: wherein upon the occurrence of at least one such condition, when no preferential or less preferential sub-networks are available for use, the processor is configured to interrupt transmission of a lower priority vehicle message and transmit the vehicle message to be expedited on a preferential or less preferential sub-network.

Example 14 includes the system of any of Examples 12-13, further comprising at least two transceivers; and wherein each transceiver operates on a unique sub-network.

Example 15 includes the system of any of Examples 12-14, further comprising a database stored in the memory; and wherein the database stores the sub-network preference data in a sub-network preference table, and stores the at least one set of rule(s) that specify the at least one condition when expedite the transmission of the vehicle message in at least one table.

Example 16 includes the system of Example 15, wherein the at least one table comprises an emergency vehicle messages table; and wherein memory comprises, or the processor is configured to receive, an emergency flag.

Example 17 includes the system of any of Examples 15-16, wherein the at least one table comprises an expedited vehicle messages table.

Example 18 includes the system of any of Examples 15-17, wherein the at least one table comprises at least one threshold(s) table.

Example 19 includes the system of Example 18, wherein the at least one threshold(s) table comprises at least one of the following: a round trip time threshold(s) table, a vehicle message type threshold(s) table, and a sub-network threshold(s) table.

Example 20 includes the system of any of Examples 15-19, wherein the database comprises regional databases wherein each regional database comprises a regional sub-network preference table and at least one table which specifies at least one condition to expedite transmission of a vehicle message of at least one vehicle message type.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for processing vehicle messages, comprising:
   receiving a vehicle message for transmission;
   determining whether a condition exists to expedite transmission of the vehicle message regardless of source of origin of the vehicle message;
   determining if a preferential sub-network is available;
   determining if at least one less preferential sub-network is available; and
   when the condition exists, when the preferential sub-network is not available for use, and the less preferential sub-network is available, expediting the transmission of the vehicle message over a less preferential sub-network.

2. The method of claim 1, wherein when the condition exists, when the preferential sub-network is not available for use, and the less preferential sub-network is available, expediting the transmission of the vehicle message over one of the at least one of the less preferential sub-network comprises wherein when the condition exists, when the preferential sub-network is not available for use, and the less preferential sub-network is available, expediting the transmission of the vehicle message over a less preferential sub-network having the highest preference.

3. The method of claim 1, determining whether a condition exists to expedite transmission of the vehicle message further comprises determining if the vehicle message is an emergency message.

4. The method of claim 1, determining whether a condition exists to expedite transmission of the vehicle message further comprises determining if the vehicle message is of an expedited vehicle message type.

5. The method of claim 1, wherein determining whether a condition exists to expedite transmission of the vehicle message further comprises determining if a threshold has been exceeded.

6. The method of claim 5, wherein determining if the threshold has been exceeded further comprises determining if the vehicle message is of an expedited vehicle message type whose vehicle message type threshold has been exceeded.

7. The method of claim 5, wherein determining if the threshold has been exceeded further comprises determining if a sub-network round trip time threshold has been exceeded.

8. The method of claim 5, wherein determining if the threshold has been exceeded further comprises determining if a sub-network threshold has been exceeded.

9. A method for processing vehicle messages, comprising:
   receiving a vehicle message for transmission;
   determining whether a condition exists to expedite transmission of the vehicle message;
   determining if a preferential sub-network is available;
   determining if a less preferential sub-network is available;
   when the condition exists, the preferential sub-network is not available for use, and the less preferential sub-network is not available, then determining if a vehicle message of a lower priority type is being transmitted or acknowledged on an active preferential or less preferential sub-network; and
   if a vehicle message of a lower priority type is being transmitted or acknowledged on an active preferential or less preferential sub-network, then interrupting the transmission or acknowledgement of the vehicle message of the lower priority type and transmitting on the same sub-network the vehicle message for which the condition exists to expedite transmission.

10. The method of claim 9, wherein if a vehicle message of the lower priority type is being transmitted or acknowledged on an active preferential or less preferential sub-network, then interrupting the transmission or acknowledgement of the vehicle message of the lower priority type and transmitting on the same sub-network the vehicle message for which the condition exists to expedite transmission further comprises complete transmission and acknowledgement of the interrupted vehicle message of a lower priority type after completing transmission and receiving an acknowledgement of receipt of the vehicle message for which the condition exists to expedite transmission.

11. The method of claim 9, wherein determining if a vehicle message of a lower priority type is being transmitted or acknowledged on an active preferred or less preferred sub-network further comprises:
   determining if the vehicle message is an emergency vehicle message;
   if the vehicle message is an emergency message, then determining if any non-preferential sub-networks are available; and
   if a non-preferential sub-network is available, then transmitting the vehicle message on the non-preferential sub-network.

12. A system, comprising:
   a processor;
   a memory coupled to the processor
   wherein the memory stores sub-network preference data and at least one at least one set of rule(s) that specify at least one condition when to expedite the transmission of a vehicle message regardless of source of origin of the vehicle message;
   wherein the processor is configured to process one or more vehicle messages of different vehicle message types; and
   wherein upon the occurrence of at least one such a condition, when the most preferred sub-network is not available and a less preferred sub-network is available, the processor is configured to expedite transmission of the vehicle message over the less preferred available sub-network.

13. The system of claim 12, further comprising: wherein upon the occurrence of at least one such condition, when no preferential or less preferential sub-networks are available for use, the processor is configured to interrupt transmission of a lower priority vehicle message and transmit the vehicle message to be expedited on a preferential or less preferential sub-network.

14. The system of claim 12, further comprising at least two transceivers; and
wherein each transceiver operates on a unique sub-network.

15. The system of claim 12, further comprising a database stored in the memory; and
wherein the database stores the sub-network preference data in a sub-network preference table, and stores the at least one set of rule(s) that specify the at least one condition when expedite the transmission of the vehicle message in at least one table.

16. The system of claim 15, wherein the at least one table comprises an emergency vehicle messages table; and
wherein memory comprises, or the processor is configured to receive, an emergency flag.

17. The system of claim 15, wherein the at least one table comprises an expedited vehicle messages table.

18. The system of claim 15, wherein the at least one table comprises at least one threshold(s) table.

19. The system of claim 18, wherein the at least one threshold(s) table comprises at least one of the following: a round trip time threshold(s) table, a vehicle message type threshold(s) table, and a sub-network threshold(s) table.

20. The system of claim 15, wherein the database comprises regional databases wherein each regional database comprises a regional sub-network preference table and at least one table which specifies at least one condition to expedite transmission of a vehicle message of at least one vehicle message type.

* * * * *